(12) United States Patent
Berg et al.

(10) Patent No.: US 6,597,454 B1
(45) Date of Patent: Jul. 22, 2003

(54) COLOR MEASUREMENT INSTRUMENT CAPABLE OF OBTAINING SIMULTANEOUS POLARIZED AND NONPOLARIZED DATA

(75) Inventors: Bernard J. Berg, Kentwood, MI (US); Timothy L. Walker, West Olive, MI (US); Michael J. Mater, Kentwood, MI (US)

(73) Assignee: X-Rite, Incorporated, Grandville, MI (US)

( * ) Notice: Subject to any disclaimer, the term of this patent is extended or adjusted under 35 U.S.C. 154(b) by 0 days.

(21) Appl. No.: 09/570,577

(22) Filed: May 12, 2000

(51) Int. Cl.[7] ............................................. G01N 21/25
(52) U.S. Cl. ........................ 356/418; 356/402; 356/369
(58) Field of Search ................................ 356/418, 416, 356/402, 73, 445, 446, 447, 448, 369

(56) References Cited

U.S. PATENT DOCUMENTS 3,818,198 A * 6/1974 Walker et al. ............... 356/233
4,469,442 A * 9/1984 Reich ........................ 356/364

OTHER PUBLICATIONS

"A Guide to Understanding Graphic Arts Densitometry" (X-Rite, Incorporated 1994).
"Applied Densitometry–Gretag Color Control Systems" (Undated but acknowledged as prior art).
"Densitometry made in Switzerland" (Undated but acknowledged as prior art).
T. Celio et al, "The use of polarizing filters in the measurement of optical reflection density" (Undated but acknowledged as prior art).
H. H. Hull, "The Polarizing Reflection Densitometer," GATF Research Progress, General Memo No. 13 (Undated but acknowledged as prior art).
P.E. Borkowski, "Polarizing Filters Suppress Reflectance in Densitometric Instrument Readings," *Graphic Arts Monthly*, pp. 100–102 (Apr. 1981).
J. MacPhee et al, "The Effect of Paper Topography on Print Density," *GATFWorld*, pp. 14–16 (Jan./Feb. 1995).
G. Wyszecki et al, *Color Science—Concepts and Methods, Quantitative Data and Formulae*, 2nd Edition, pp. 49–54 (John Wiley & Sons—Undated but acknowledged as prior art).

* cited by examiner

*Primary Examiner*—Frank G. Font
*Assistant Examiner*—Roy M. Punnoose
(74) *Attorney, Agent, or Firm*—Warner Norcross & Judd LLP

(57) ABSTRACT

A color measurement instrument capable of measuring both the nonpolarized spectral response and the polarized spectral response of a sample on a single reading. The instrument includes a source of polarized light to illuminate the sample, and a detector for measuring the light reflected by the sample. A rotatable filter wheel is located between the sample and the detector. Nonpolarizing bandpass filters and polarizing bandpass filters are mounted in the wheel in a circular configuration. A drive mechanism rotates the wheel to automatically sequentially align each of the nonpolarizing filters and the polarizing filters with the detector, enabling the instrument to sample both nonpolarized data and polarized data on a single reading.

19 Claims, 15 Drawing Sheets

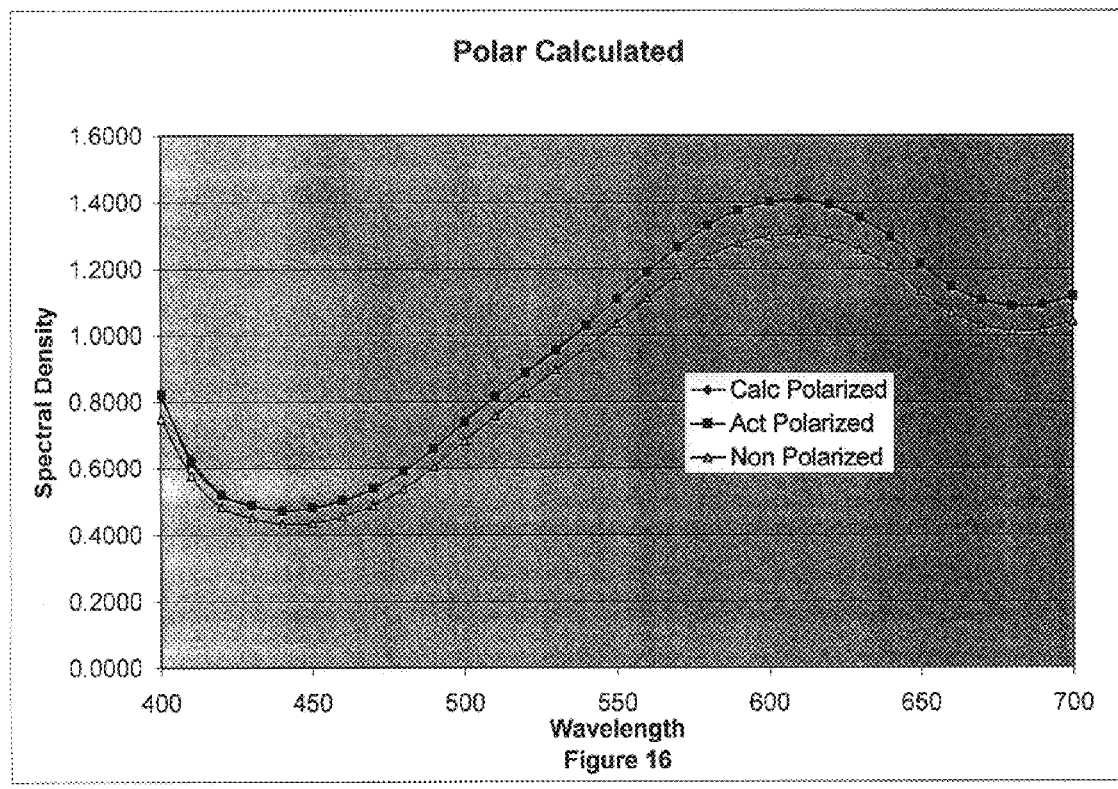

COLOR MEASUREMENT INSTRUMENT CAPABLE OF OBTAINING SIMULTANEOUS POLARIZED AND NONPOLARIZED DATA

BACKGROUND OF THE INVENTION

The present invention relates to color measurement instruments, and more particularly to such instruments that use polarized light in making measurements.

Optical density is used in the printing arts both as a measurement of ink film thickness and as a rough measurement of color by measuring the amount of light reflected off an object and passing through an optical filter. The amount of light that is reflected by an object is affected by many things, including its surface. An ink with a smooth surface will reflect light differently than one with a rough surface. This difference can have a significant effect when measuring the optical density of a wet ink because, when the ink is first applied, it forms a smooth surface over the top of the rough paper. However, as it dries, it conforms more to the surface of the paper, developing a rougher finish.

Light reflected from a printed surface usually consists of two components. The first component is "first-surface" or "specular" reflection, and the second component is backscattering from below the surface of the ink. The first component is the light reflected from the surface of the ink and is associated with a property known as "gloss". The second component is the light reflected from below the surface of the ink. Only the second component depends on the color of the printed ink.

The current method of minimizing the difference between a wet-ink reading and a dry-ink reading is (1) to shine a light through a polarizing filter onto the surface of an object and (2) to detect the light that is reflected off the object through another polarized filter oriented at 90 degrees to the first polarizing filter. The theory behind such an approach is that the light reflected off the surface of the wet ink remains polarized, while the light that passes through the ink and is reflected off the paper becomes nonpolarized. The cross-polarized filter on the sensor side removes the polarized component of the light, leaving only the light that has been reflected off the paper. Therefore, the process more closely simulates the effect of dry ink. For example, when the sample is illuminated at a 45-degree angle, and the reflected light is read at a zero-degree angle (i.e. perpendicular to the sample), the influence of specular reflection is almost completely suppressed.

Unfortunately, polarization weakens the correspondence between the visual impression of the printed sample and the measured density value of the printed ink. When polarization is used, it is important that the spectral and other optical properties of the polarizing filters be taken into account during the design of the instrument. A densitometer that conforms to specifications given in ISO 5-3 and ISO 5-4 without polarization may fail to do so after the addition of polarization filters. Likewise, an instrument with polarization that was designed to conform to specifications given in ISO 5-3 and ISO 5-4 may not conform after the filters have been removed.

Also, there are compromises to the polarization approach. First, the amount of light received by the sensor is greatly reduced by the set of polarizing filters. This increases the difficulty in accurately and repeatably measuring the reflected light. Second, the original characteristics of the light are "lost" when it passes through the cross-polarized filter. Once the light has been cross-polarized, there is no practical way of determining the component of the light that was removed by the polarizing filters.

Color measurement instruments sold by GretagMacbeth of Regensdorf, Switzerland provide a user the option of taking a polarized reading or a nonpolarized reading. These instruments include polarizing filters that are mechanically moved into or out of alignment with the optical engine. The filters are manually moved in Models D19C and SPM100. The filters are automatically moved in response to keyboard input in Model SpectroEye. In operation, the user selects either the polarized mode or the nonpolarized mode and operates the instrument consistently in the selected mode. If a user were to attempt to obtain both polarized and nonpolarized readings of a single sample, a first reading would need be taken; the filters must be manipulated; and a second reading must be taken. This process would be cumbersome and would often result in sampling of different spots or portions on the object, leading to consistency problems. The two readings also would likely involve different illumination, further contributing to consistency problems.

SUMMARY OF THE INVENTION

The aforementioned problems are overcome in a first aspect of the present invention wherein both polarized data and nonpolarized data is acquired in a single reading. More specifically, the reflected light passes through both polarizing and nonpolarizing filters on a single reading. Consequently, polarized and nonpolarized data is acquired from the same sample area under identical illumination. In the preferred embodiment, the filters are mounted in a wheel that rotates during a reading to interpose both polarizing and nonpolarizing filters in the reflected light path.

In a second aspect of the invention, the nonpolarized spectral response is sampled at a first set of wavelengths; the polarized spectral response is sampled at a second set of wavelengths, with the two sets of wavelengths being non-identical; and the spectral responses at non-sampled wavelengths are calculated as a function of the actual nonpolarized readings and the actual polarized readings. This technique enables the presentation of complete spectral information for both polarized and nonpolarized data based on less-than-complete sampled data.

The present invention has several advantages over known color measurement techniques. First, both the polarized data and the nonpolarized data are acquired in a single reading. Second, precisely the same sample spot is measured for both polarized and nonpolarized data. Third, the polarized and nonpolarized data is acquired under identical lighting conditions. Fourth, the user need not reconfigure the instrument between polarized and nonpolarized readings. Fifth, the instrument provides a common hardware platform for a series of instruments with different functionality implemented primarily in software and firmware. Sixth, the instrument is straightforward and produces full spectral data efficiently, economically, and precisely.

These and other objects, advantages, and features of the invention will be more fully understood and appreciated by reference to the detailed description of the preferred embodiment and the drawings.

BRIEF DESCRIPTION OF THE DRAWINGS

FIG. 16 is a graph illustrating both the polarized data and the nonpolarized data as measured and calculated by the instrument, and also the actual polar data as independently measured.

DETAILED DESCRIPTION OF THE PREFERRED EMBODIMENT

I. Overview

Figure 2:
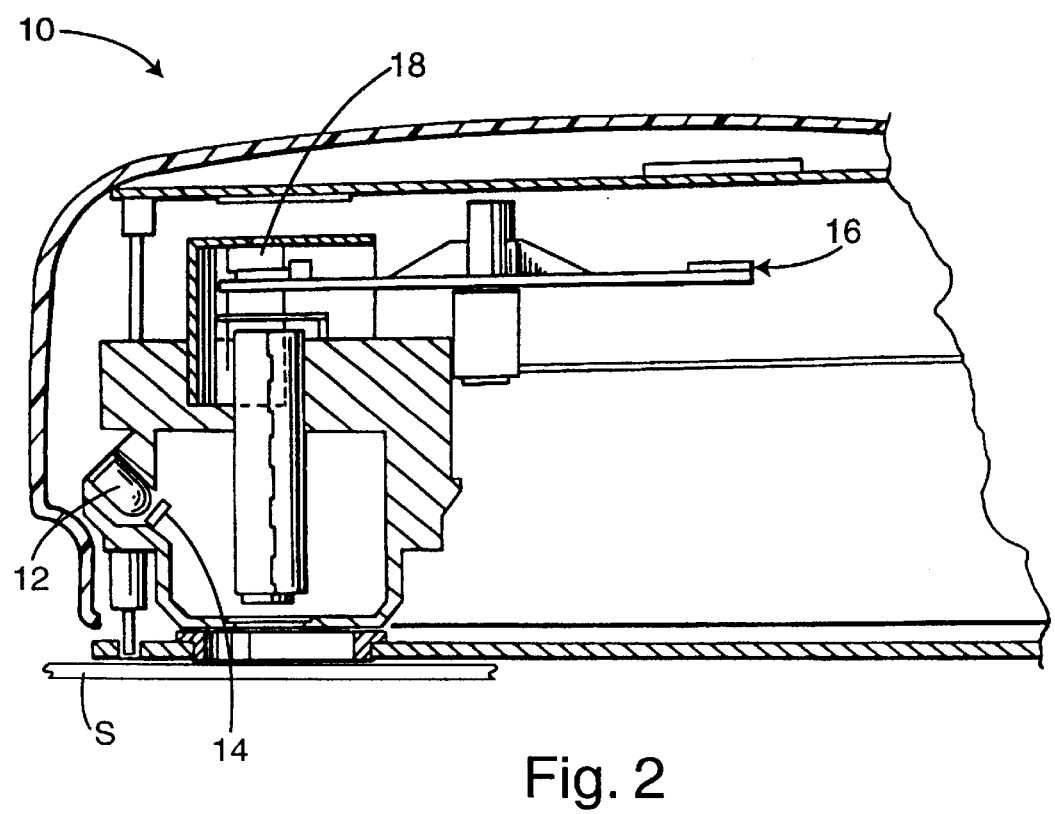
FIG. 2 is fragmentary cross-section view of the densitometer.
Figure 3:
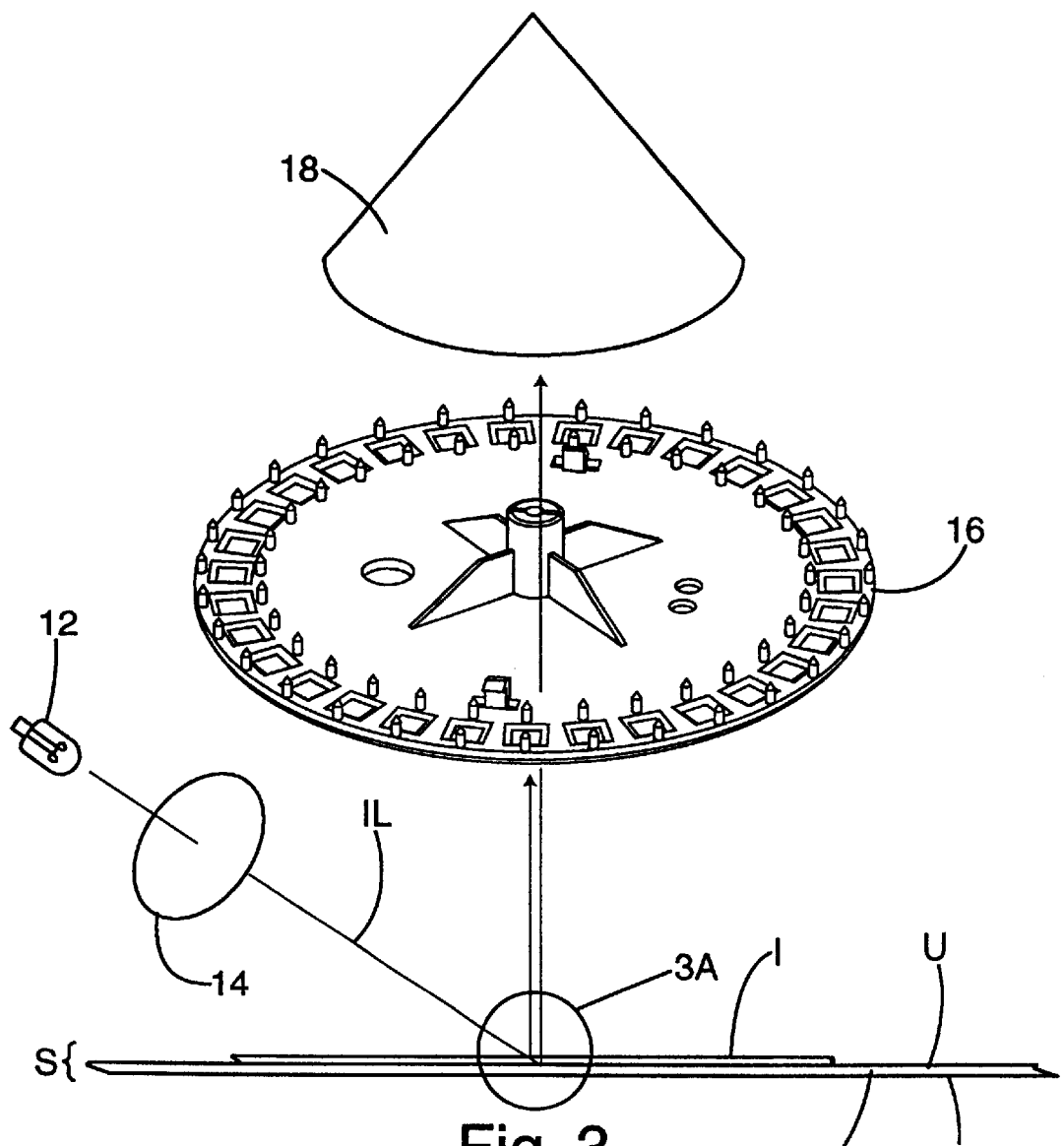
FIG. 3 is a diagrammatic view showing the sample, the illuminator, the filters, and the light detector.
Figure 3A:
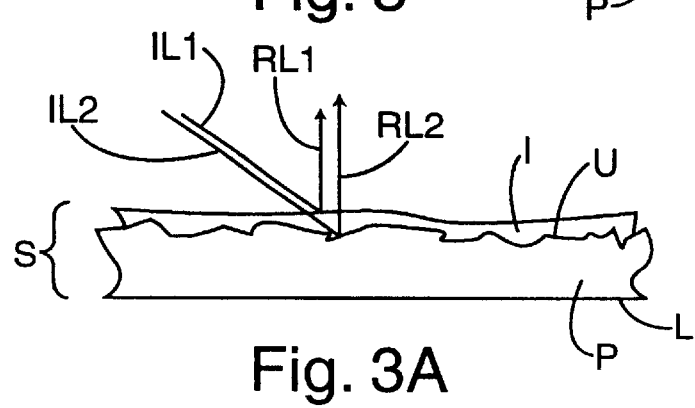
FIG. 3A is an enlarged view of the area within circle 3A of FIG. 3.

A densitometer constructed in accordance with a preferred embodiment of the invention is schematically illustrated in FIGS. 3–3A and generally designated 10. The instrument is illustrated in greater detail in FIGS. 1–2, which are discussed below. Referring to FIGS. 3 and 3A, the instrument includes an illuminator 12, an incident polarizing filter 14, a filter wheel 16, and a detector 18. The filter wheel 16 in turn supports a plurality of polarized filters 20 and nonpolarized filters 22 (see FIG. 4), which will be described in greater detail below. The densitometer 10 is designed to read a sample S which includes a paper P or other substrate printed with an ink I. More specifically, the paper P has an upper surface U and a lower surface L. The ink I is printed on the upper surface U.

During a measurement, the illuminator 12 is powered to illuminate the sample S. the polarizing filter 14 is interposed between the illuminator 12 and the sample S to polarize the light striking the sample. The light reflected from the sample S passes through the individual filters 20 and 22 before striking the detector 18. The filter wheel 16 rotates during a measurement so that the detector can read or sample the light passing through each of the filters located about the periphery of the wheel.

Data is collected at twenty-two nonpolarized wavelengths and nine polarized wavelengths as will be described. The instrument calculates complete polarized and nonpolarized spectral data using a novel methodology. Consequently, complete polarized and nonpolarized spectral information is produced for the user based on samples for less than all of the information.

II. Instrument

Figure 1:
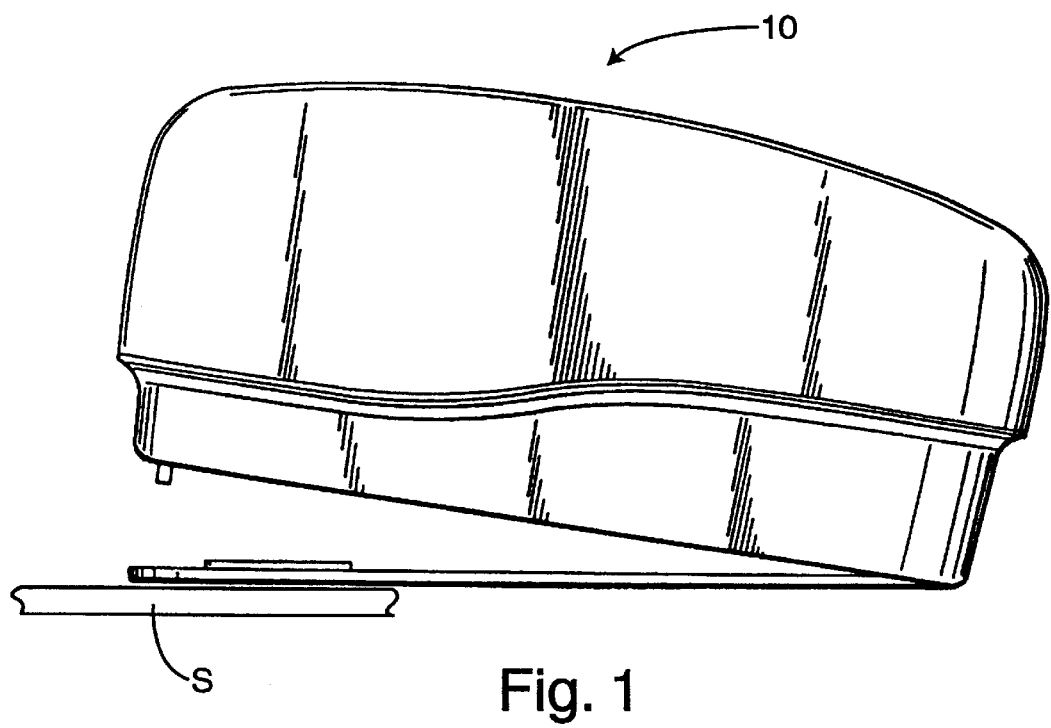
FIG. 1 is a side elevation view of the densitometer of the present invention.

The hardware platform for the present invention is generally well known to those skilled in the art and is illustrated in FIGS. 1–2. This platform is disclosed and described in greater detail in U.S. Pat. No. 6,002,488 issued Dec. 14, 1999 and entitled "Compact Spectrophotometer", the disclosure of which is incorporated by reference. Only the differences between the previous instrument and the present instrument will be described.

Figure 4:
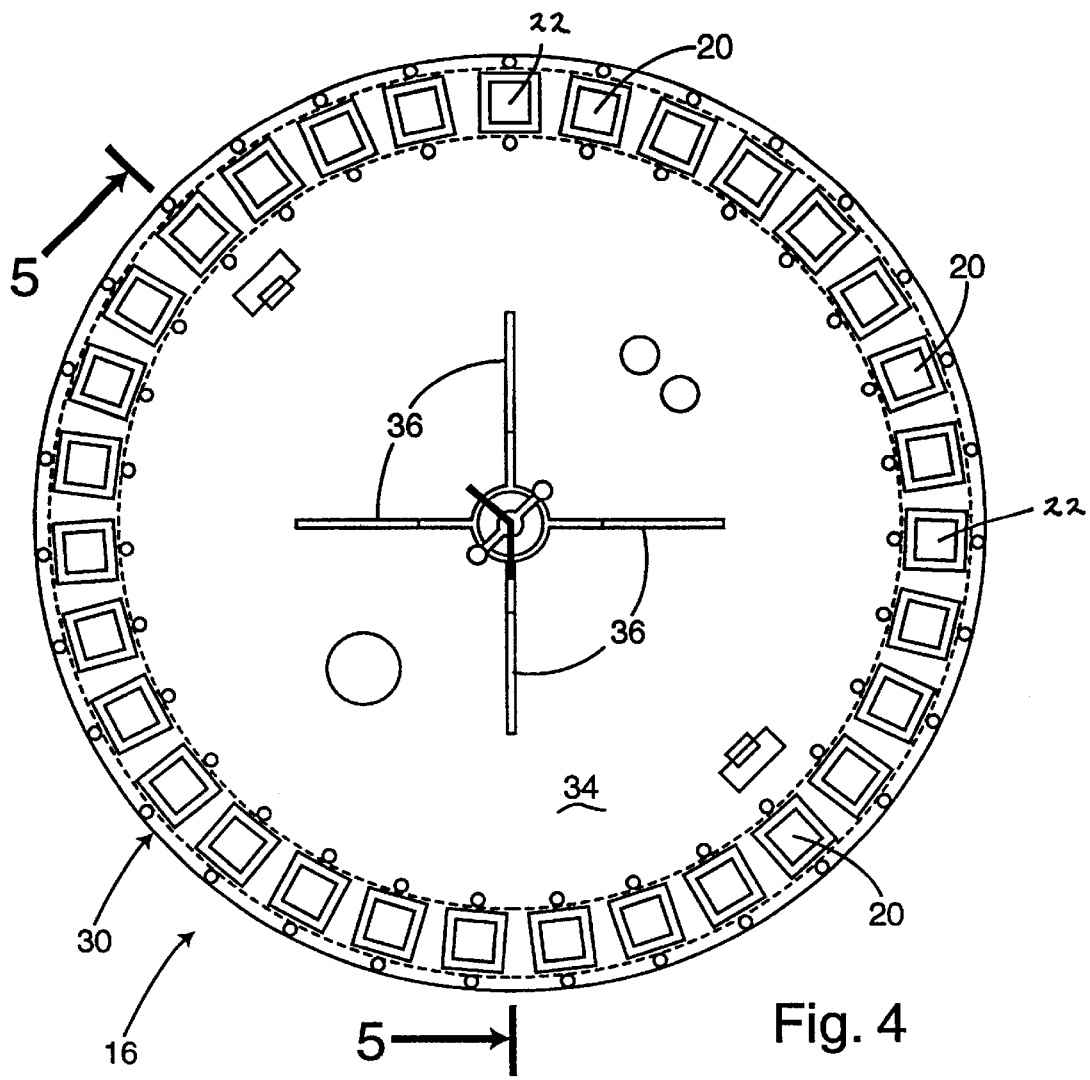
FIG. 4 is a plan view of the filter wheel.
Figure 5:
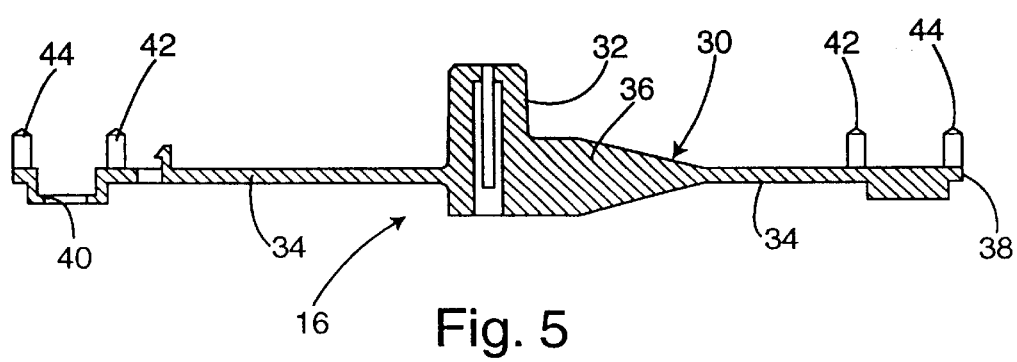
FIG. 5 is a sectional view of the filter wheel taken along Line 5—5 in FIG. 4.

The filter wheel 16 is illustrated in greatest detail in FIGS. 4 and 5. With the exception of the specific filters 20, the filter wheel 16 is generally well known to those skilled in the art and is illustrated, for example, in the previously referenced U.S. Pat. No. 6,002,488. The wheel 16 includes a body 30 and a plurality of filters 20 supported thereby. The body 30 is integrally formed of a single piece of plastic. The body includes a hub 32, a disk portion 34, a plurality of radial ribs 36, and a peripheral edge 38. A plurality of windows or openings 40 are equally spaced about the perimeter of the wheel 16 generally adjacent the peripheral edge 38. The openings 40 are in a circular configuration concentric with the hub 32. A pair of pins 42 and 44 extends upwardly from the peripheral inner edge and the peripheral outer edge, respectively, of each window 40.

The selection and arrangement of the polarizing filters 20 and the nonpolarizing filters 22 is unique to the present invention. Each filter 20 or 22 is a narrow pass-band filter.

Twenty-two nonpolarizing filters 22 are provided at the following wavelengths:

Wavelength 400
410
420
430
440
450
460
470
480
490
500
520
530
540
560
580
600
640
660
680
700

Nine polarizing filters 20 are provided at the following wavelengths:

Wavelength 430
450
470

490
520
540
560
600
640

The filter wheel 16 is mounted for rotational movement about hub 32. Accordingly as the wheel rotates, the filter wheel 16 sequentially interposes each of the filters 20 between the sample S and the detector 18 (see also FIG. 3) so that the light reflected from the sample through each of the filters can be determined. The mounting, rotation, and control of the wheel 30 can all be as described in the referenced U.S. Pat. No. 6,002,488.

III. Sample and Light Path

A sample S to be measured by the densitometer 10 is illustrated in greatest detail in FIG. 3A. The sample S includes a paper sheet P and an ink I printed or otherwise deposited thereon. The paper includes upper and lower surfaces U and L, respectively. Substrates other than paper are also well known and within the scope of the present invention. Both the upper and lower surfaces U and L are something other than flat, depending on the paper or other substrate. The character of the upper surface U is exaggerated in FIG. 3A as being relatively rough to illustrate the concepts behind the present invention. The present invention is applicable to both substrates considered "smooth" and substrates considered "rough". The ink I is smoother than the upper surface U on which the ink is printed. This is because the ink tends to fill in the rough spots on the upper surface of the paper and therefore provide a relatively flat or "shiny" surface of relatively high gloss. The gloss of the ink I typically decreases as it dries. This reduction in gloss during drying is often referred to as "dry back".

The present invention has its greatest utility in measuring nonpolarizing surfaces. For example, printed ink is nonpolarizing and therefore particularly well-suited to the described methodology. The present invention is not particularly well suited to measuring polarizinig surfaces such as some metals, some plastics, some laminates and overlaminates, and some coatings and overcoatings.

FIG. 3A further illustrates the reflection of illuminating light by the sample S. Incident light includes a first ray IL1 and a second ray IL2. The first ray IL1 is reflected by the upper surface of the ink I to produce reflected light ray RL1. Incident light ray IL2 passes through the ink I to be reflected by the upper surface U of the paper P to produce reflected light ray RL2. Therefore, RL1 represents first-surface reflection, which RL2 represents back-scattering reflection.

When the incident light IL is polarized as in the present invention, the resultant nature of the reflected light rays RL1 and RL2 are different. Specifically, light ray RL1 which is reflected by the ink I retains the polarization and therefore is polarized. Light ray RL2 which passes through the ink loses the polarization and therefore is nonpolarized. Consequently, a nonpolarized filter 20 in filter wheel 16 passes both of rays RL1 and RL2. However, a polarized filter 22 in filter wheel 16 passes only ray RL2. By mathematically processing the data acquired through the polarized and nonpolarized filters, the present densitometer calculates the complete spectral response—both polarized and nonpolarized—of the sample S.

IV. Mathematical Algorithm and Processing

Figure 6:
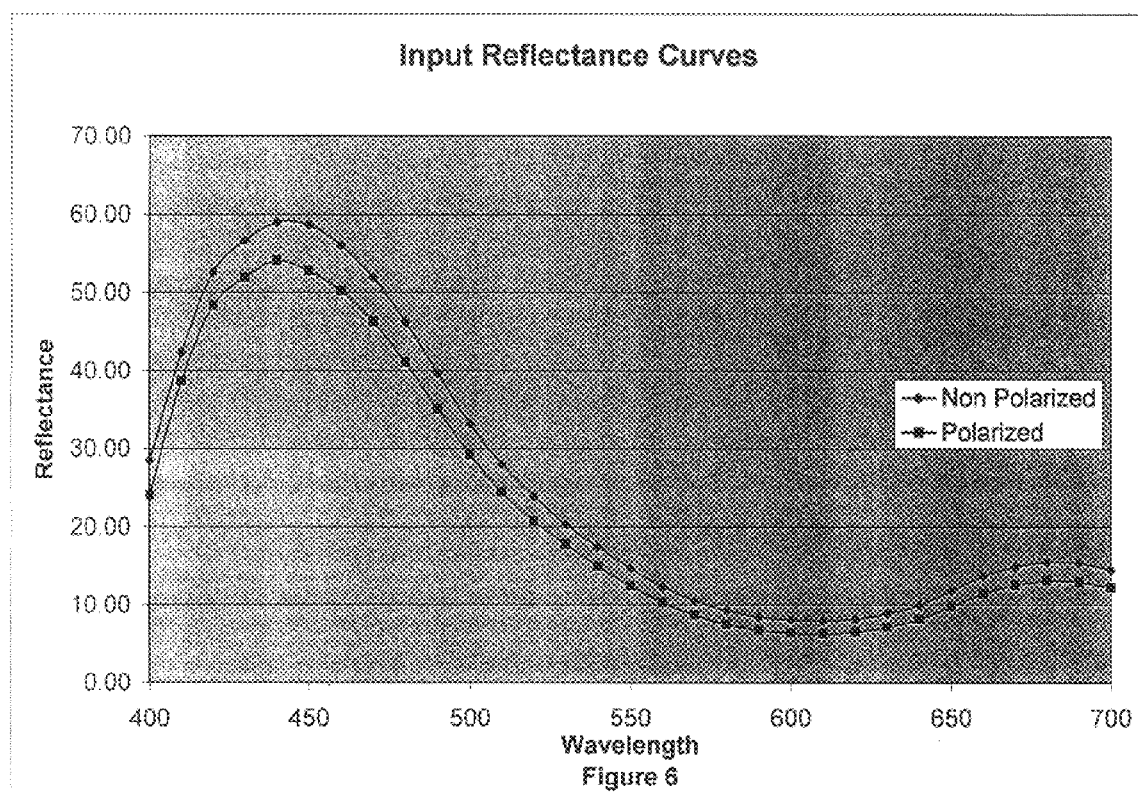
FIG. 6 is a graph showing the actual reflectance values measured at 10 nanometer (nm) increments for a selected sample.
Figure 7:
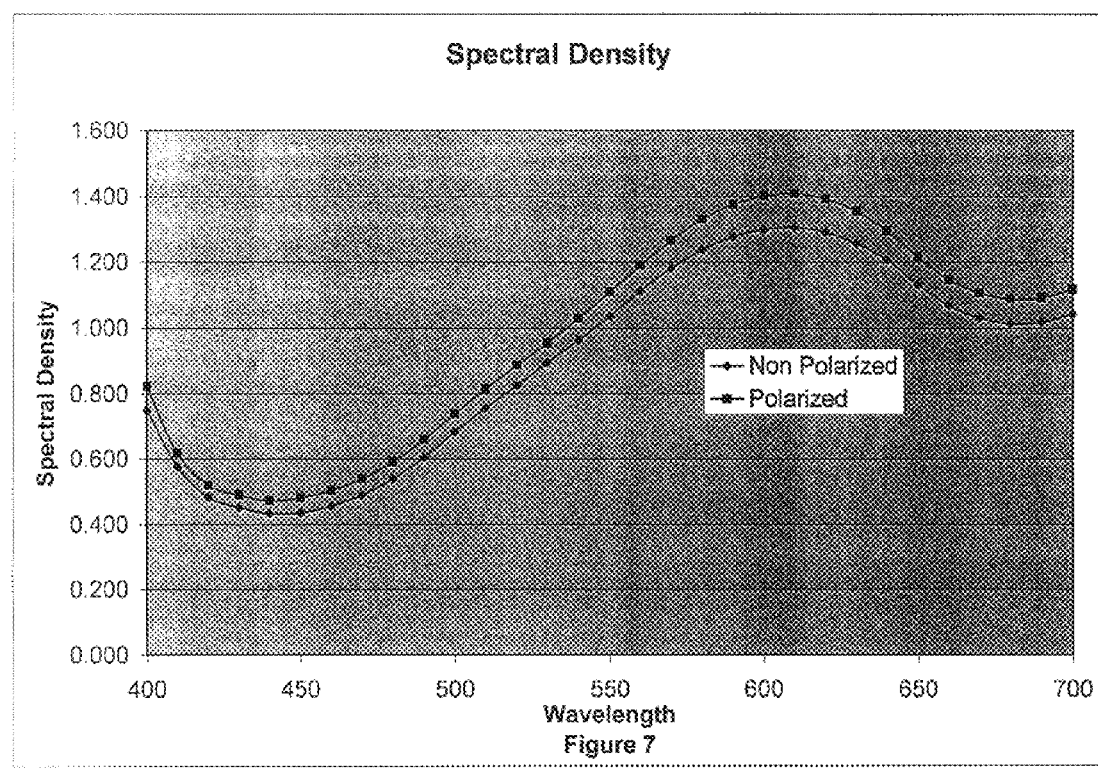
FIG. 7 corresponds to FIG. 6 and shows the actual spectral density of the sample at 10 nm increments.

FIGS. 6 and 7 illustrate the actual reflectance and spectral density, respectively, of a sample color used as an example for this application. FIG. 6 includes a polarized reflectance value and a nonpolarized reflectance value at each 10 nm increment between 400 nm and 700 nm inclusive. The reflectance values in FIG. 6 are expressed as percentages. For example, the reflectance of light at 450 nm is approximately 59% for the nonpolarized reading and 54% for the polarized reading. FIG. 7 illustrates the spectral density values corresponding to the reflectance values illustrated in FIG. 6. Spectral density ($D_\lambda$) is calculated according to the following formula:

$$D_\lambda = \log_{10}(Inst_{max}/R_\lambda)$$

where $R_\lambda$ = the reflectance at wavelength $\lambda$.

$Inst_{max}$ = the maximum reflectance value of the instrument The maximum reflectance value ($Inst_{max}$) is the maximum reflectance that can be read by the instrument. In the preferred embodiment, the maximum reflectance value of the instrument is 160. Reflectance values can exceed 100 if the sample fluoresces.

FIGS. 6 and 7 show the actual data for each of the 10 nm readings. It is not possible to directly measure all of these sixty-two data points using the instrument of the present invention. The present instrument attempts to reproduce the actual data illustrated in FIGS. 6 and 7 using a limited subset of readings. In other words, if the filter wheel 16 of the present invention included 62 filters, the algorithm of the present invention would not be necessary. The inclusion of 62 filters would permit thirty-one polarizing filters and thirty-one nonpolarizing filters; and consequently the instrument would be capable of acquiring actual data at each of the 10 nm increments for both polarized and nonpolar. While such a technique is within the intended scope of the present application, such a technique would not utilize the processing algorithm described in the remainder of this application.

The total of thirty-one filters was selected because this number facilitated hardware implementation based on a previous product platform that also included thirty-one filters as illustrated in U.S. Pat. No. 6,002,488. Other numbers of filters could be substituted, and any combination of nonpolarizing and polarizing filters could be used so long as they do not exceed the total number of filter openings in the wheel. It is readily contemplated that greater or fewer filters could be used, and such are within the scope of the present application. Also, the selection of the wavelengths for the polarizing and nonpolarizing filters is a matter of design choice. While one described set of nonpolarized and polarized wavelengths has been described, the selection of wavelengths can be readily modified within the spirit of the present invention.

Figure 8A:
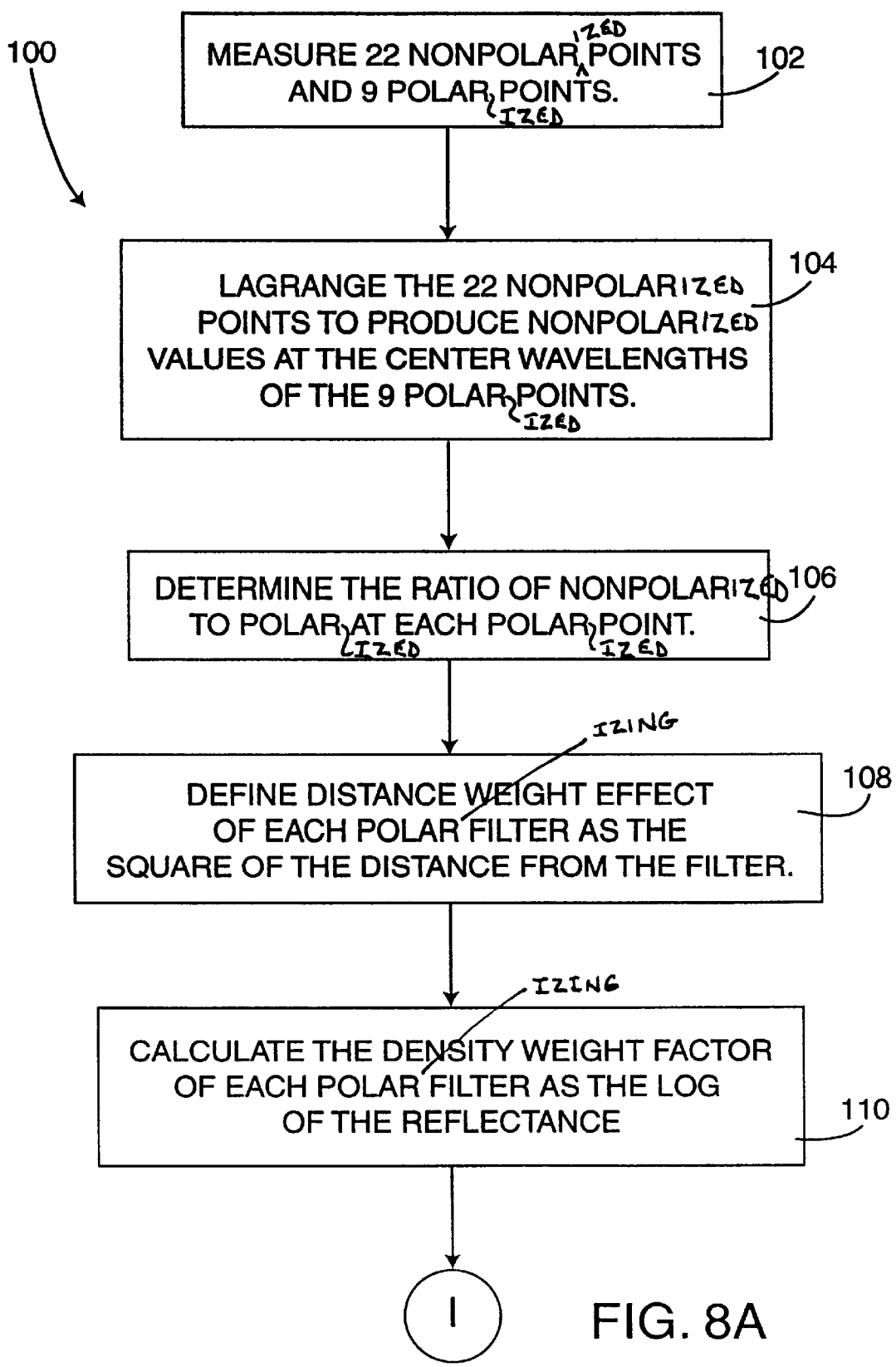
FIGS. 8A and 8B are flow charts illustrating the algorithm of the present invention for calculating filtered and unfiltered data based on limited actual data.
Figure 8B:
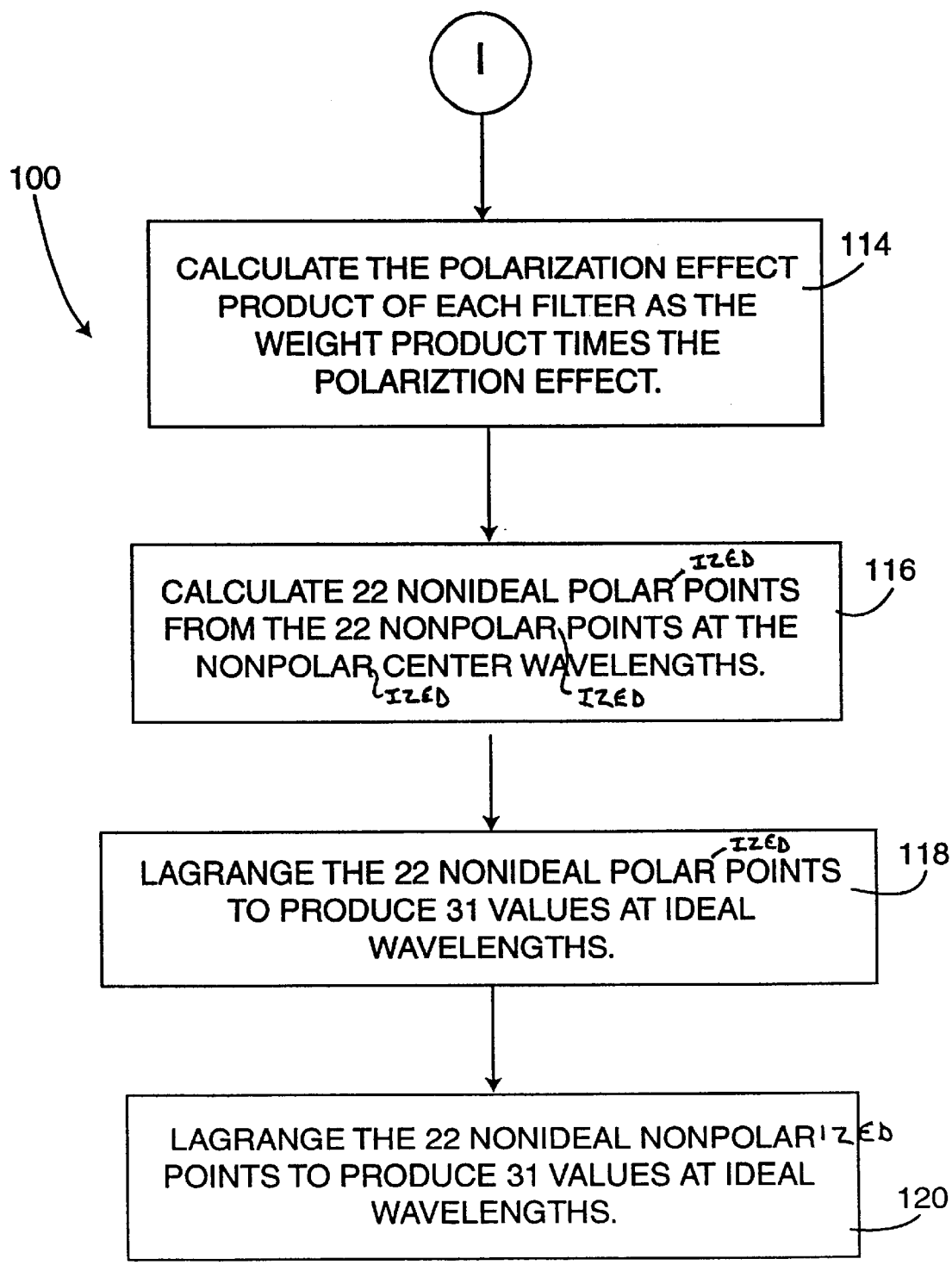

FIGS. 8A and 8B are flowcharts illustrating the mathematical algorithm and processing of the present invention. The purpose of the algorithm is to calculate complete spectral data for both polarized and nonpolarized curves. In the disclosed embodiment, the two curves are polarized reflectance and nonpolarized reflectance.

The flowcharts of FIGS. 8A and 8B will be described in conjunction with FIGS. 9–16 which illustrate the state of the data—both actual and calculated—at various points or stages of the processing. Generally speaking, a subset of actual polarized data and a subset of actual nonpolarized data are acquired by the unit. The mathematical algorithm then utilizes this less-than-complete actual data to calculate complete polarized and nonpolarized data for display to, and use by, a user of the instrument.

Figure 9:
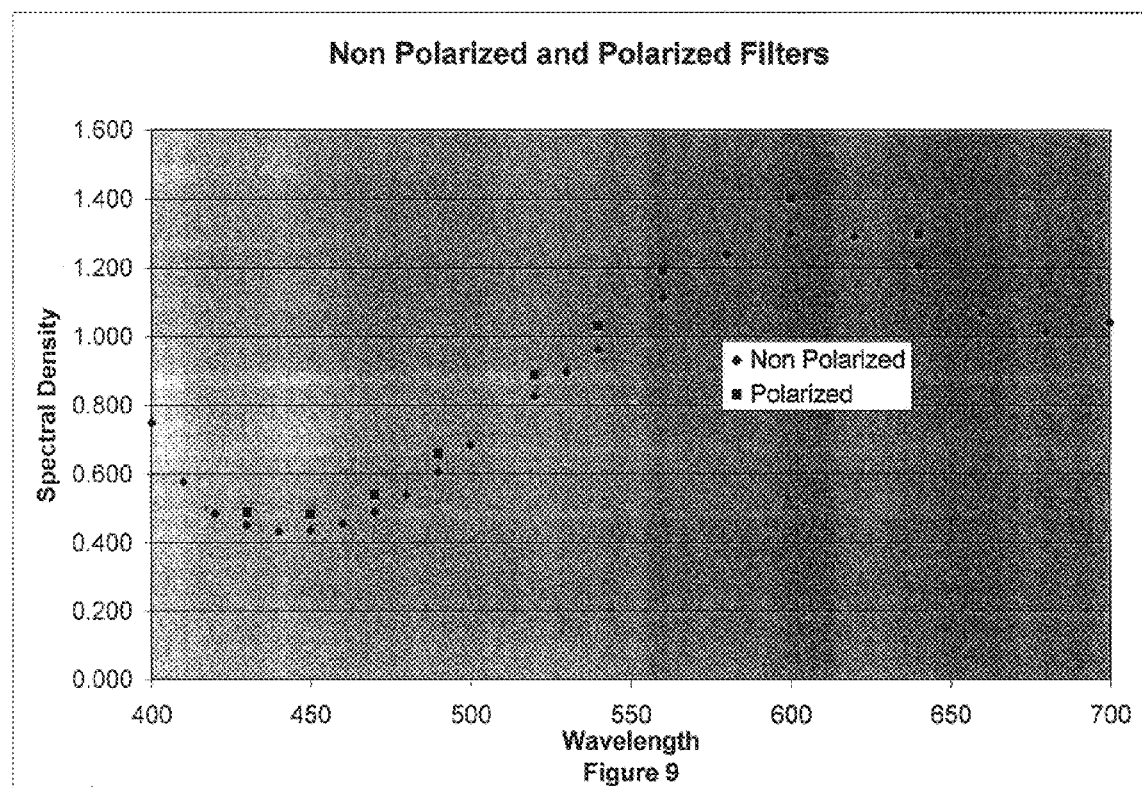
FIG. 9 is a graph showing the actual polarized and nonpolarized data measured by the present densitometer.

In the first step 102 (FIG. 8A) of the processing, the instrument is operated to acquire twenty-two actual nonpolarized readings and nine actual polarized readings through the thirty-one filters described above. FIG. 9 illustrates the spectral density of the thirty-one data points acquired in step 102. The twenty-two nonpolarized readings are indicated as solid black diamonds, and the nine polarized readings or points are indicated as hatched squares. In the preferred embodiment, a nonpolarizing filter is included at each nominal wavelength at which a polarizing filter is used. Such correspondence will improve the ultimate result of the present algorithm in calculating complete data. However, it is possible, and within the scope of the invention, to take polarized readings at nominal wavelengths that do not also include a nonpolarized reading.

In the second step 104 of the algorithm, the twenty-two nonpolarized points are Lagranged to produce nine nonpolarized values at the actual wavelengths (which may be different from the nominal wavelengths) of the nine polarized filters. Lagranging is a curve-fitting technique generally known and widely used by those skilled in the art. Therefore, the techniques of the Lagranging need not be described. With ideal filters, wherein the actual wavelength of each filter is the nominal wavelength of that filter, the Lagranging step 104 is not required.

In the next step 106, the polarization ratio of each polarized filter is calculated according to the following equation:

$$Rp = \frac{Dp}{Dn}$$

Where

Rp=Polarization ratio

Dn=Spectral density of the non-polarized curve

Dp=Spectral density of the polarized curve

For the described example, this results in the following values based on the following data:

| Polarizing Filter | 430 | 450 | 470 | 490 | 520 | 540 | 560 | 600 | 640 |
|---|---|---|---|---|---|---|---|---|---|
| Nonpolarized Density ($D_n$) | 0.451 | 0.436 | 0.489 | 0.606 | 0.826 | 0.963 | 1.112 | 1.298 | 1.206 |
| Polarized Density ($D_p$) | 0.489 | 0.482 | 0.539 | 0.659 | 0.887 | 1.029 | 1.190 | 1.401 | 1.296 |
| Polarization (Rp) | 1.085 | 1.105 | 1.102 | 1.088 | 1.074 | 1.069 | 1.070 | 1.079 | 1.074 |

Figure 10:
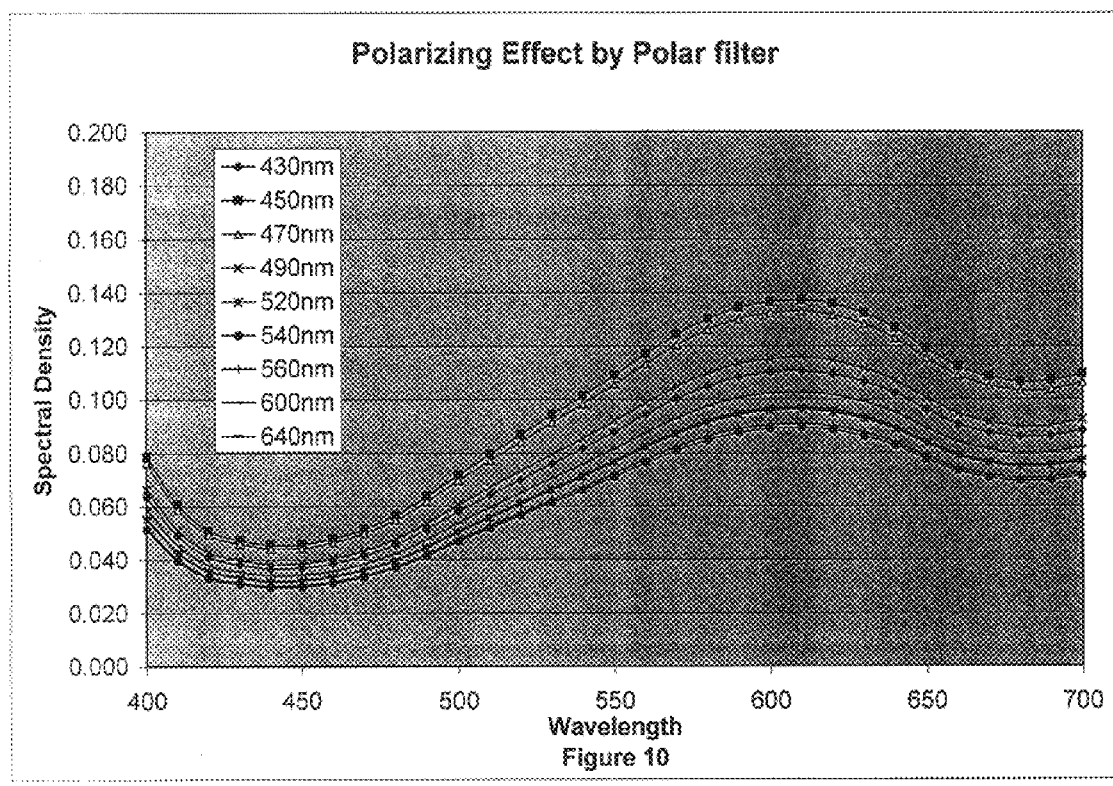
FIG. 10 is a graph illustrating the polarization effect of the nine polarizing filters.

The ratio is generally greater than 1, because the polarized filters reduce the amount of light transmitted, thereby producing higher density. The ratio is calculated for each of the narrow-band polarizing filters. The ratio is also referred to as the "polarization effect" and is illustrated in FIG. 10.

After the polarization ratios are calculated, the "polarization effect" for the entire spectrum is calculated for each polarizing filter using the following equation:

$$E(\lambda) = D_n(\lambda)(Rp-1)$$

Where $\lambda$=A 10 nm wavelength along the spectral curve.

$E(\lambda)$=Polarization effect at wavelength $\lambda$ $D_n(\lambda)$=The spectral density at nonpolarized wavelength $\lambda$ Rp=A polarization ratio FIG. 10 illustrates the polarization effect for each of the nine polarizing filters of the present invention. The polarization effect of each individual filter is presumed to be the same throughout the visible spectrum.

To apply the polarization effect to the nonpolarized data, several assumptions are made. First, it is assumed that the polarizing filter "closest" to any given wavelength (e.g. the smallest spectral displacement) best represents the polarization effect at that wavelength. (The term "spectral displacement" means the difference between two wavelengths. For example, the spectral displacement between 450 nm and 480 nm is 30 nm.) This assumption is used to create a "spectral displacement weight" algorithm. The weight given any individual filter decreases as one moves away from the point at which that filter applies. Mathematically, the algorithm is:

$$Wx_\lambda = \frac{1}{\left(1 + \frac{|\lambda - \lambda_f|}{10}\right)^n}$$

Where $Wx_\lambda$=The spectral displacement weight factor at wavelength $\lambda$ $\lambda$=The wavelength for which the weight factor is being calculated $\lambda_f$=The wavelength at which the polarization effect was measured n=The spectral displacement weight decay factor. This is empirically selected to be 3.

For example, to determine the spectral displacement weight effect at 430 nm using the polarization effect measured at 400 nm, the equation is:

$$W_{440} = \frac{1}{\left[\left(1 + \left(\frac{|430 - 400|}{10}\right)\right)^3\right]}$$

Figure 11:
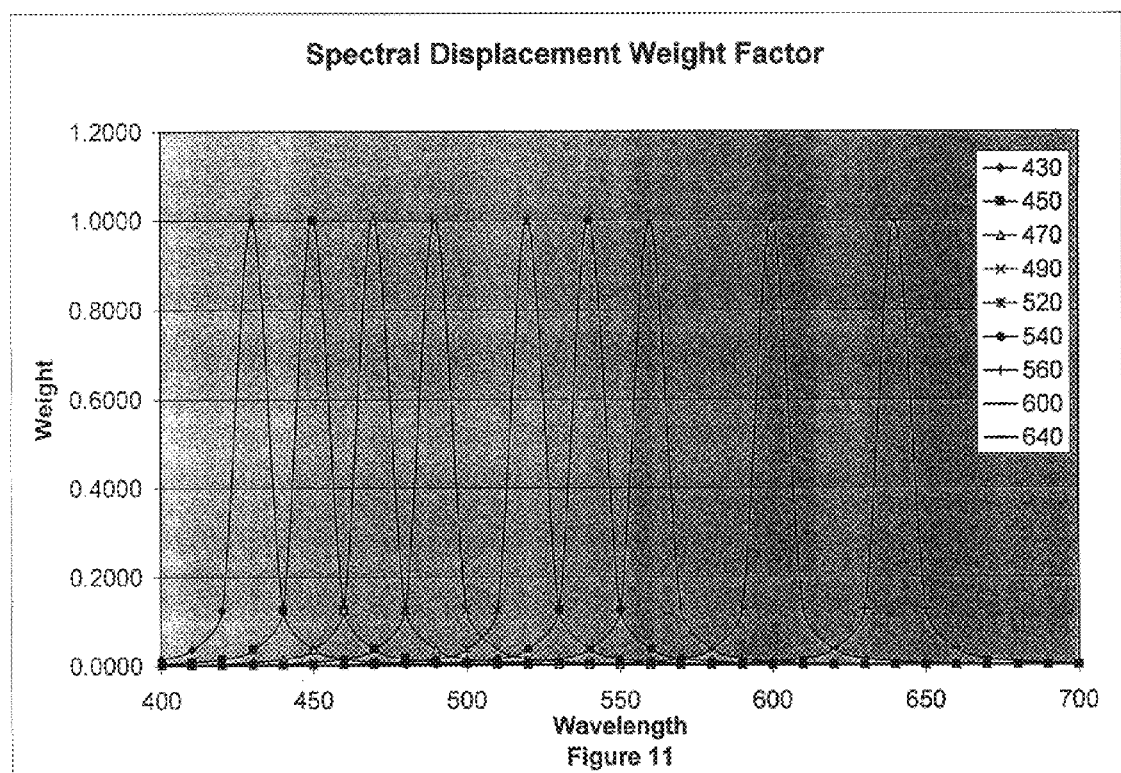
FIG. 11 is a graph illustrating the spectral displacement weight of each of the polarizing filters.

The spectral displacement weight effect of each of the nine polarizing filters is illustrated in FIG. 11. Each polarizing filter has full effect (i.e. 1.0000) at the wavelength with which it is associated. The effect of each filter drops with the cube of the spectral displacement from its nominal wavelength. For example, the spectral displacement weight effect 10 nm from the filter is 0.1250; at 20 nm from the filter is 0.0370; and so forth.

The described spectral displacement weight effect was developed empirically. It is anticipated that other techniques can be used for calculating the spectral displacement weight effect of the individual filters.

In step 110, the density weight factor of each filter is calculated. This calculation is based on the assumption that the polarization effect of each filter changes only when the nonpolarized curve changes. The density weight factor is calculated as:

$$Wd_\lambda = \frac{1}{(1 - |D_\lambda \cdot D_f|)^m}$$

Where:

$Wd_\lambda$=The density weight factor at wavelength $\lambda$ $D_\lambda$=The spectral density at nonpolarized wavelength $\lambda$ $D_f$=The spectral density at the nonpolarized wavelengths at which the polarization effect was measured.

m=The density weight decay factor. This is empirically selected as 2.

Figure 12:
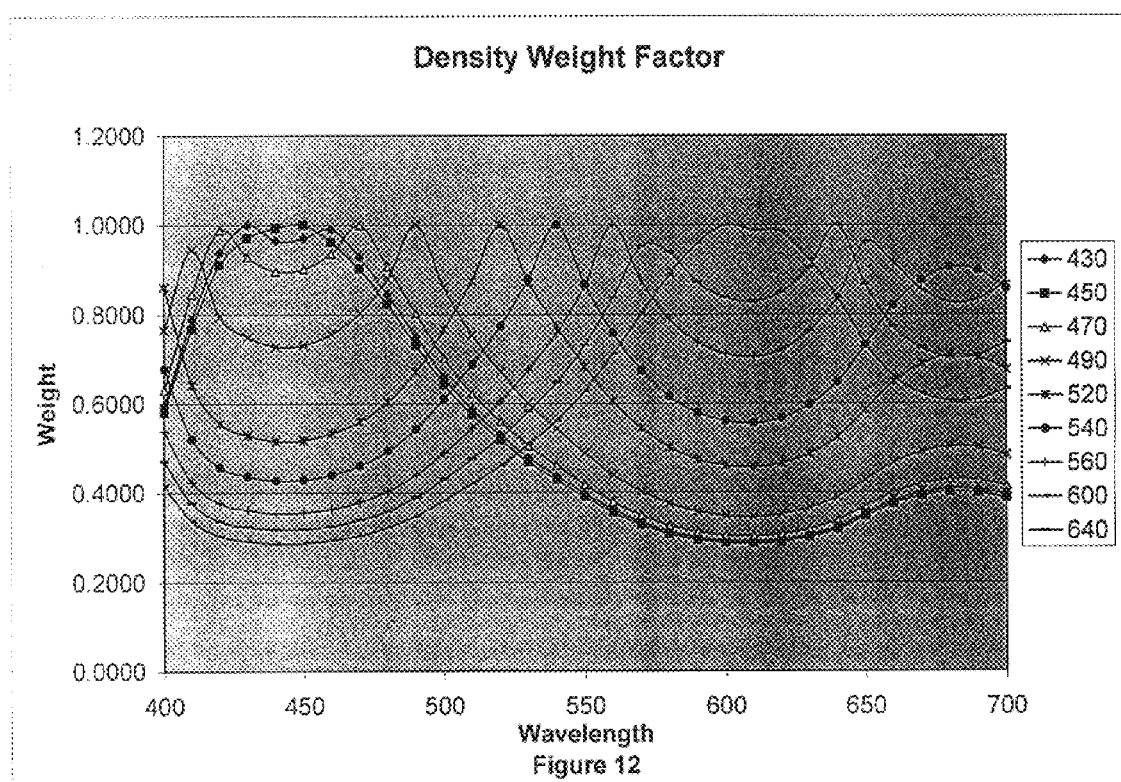
FIG. 12 is a graph illustrating the density weight of each of the polarizing filters.

FIG. 12 illustrates the density weight factor for each of the nine polarizing filters. While the spectral displacement weight factors illustrated in FIG. 11 are somewhat intuitive, the density weight factors illustrated in FIG. 12 might be considered at least somewhat counterintuitive. Generally, each density weight factor peaks at 1.0000 at its nominal wavelength. However, each density weight factor curve additionally has portions—including side lobes—that may not be totally expected.

The next step 114 in the algorithm is to calculate the "weight effect product" of each filter. The above calculations produce two weight factors and one effect for each polarizing filter. The formula for calculating the polarization effect product is:

$$E_\lambda = \frac{\sum_{n=1}^{n} Wx_{n\lambda} \cdot Wd_{n\lambda} \cdot E_{n\lambda}}{\sum_{n=1}^{n} Wx_{n\lambda} \cdot Wd_{n\lambda}}$$

Figure 13:
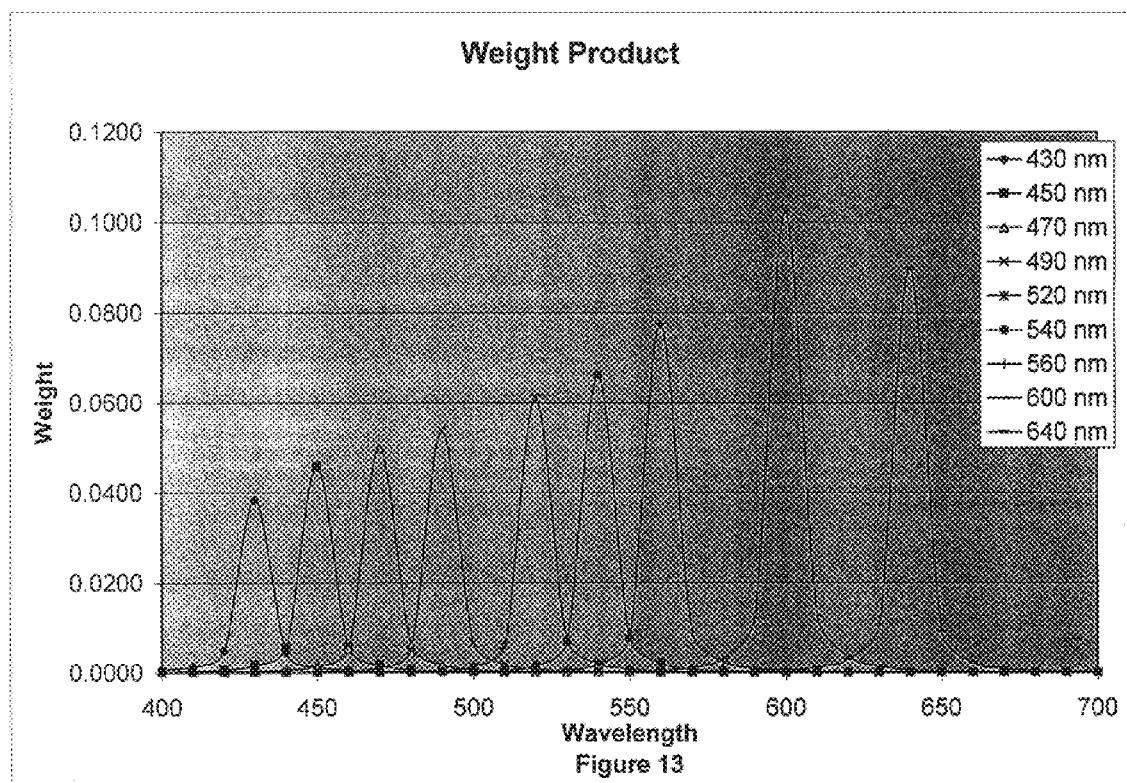
FIG. 13 is a graph illustrating the weight product for each of the polarizing filters.

Where:

$Wd_{n\lambda}$=The density weight factor at wavelength $\lambda$ for polarizing filter n $Wx_{n\lambda}$=The spectral displacement weight factor at wavelength $\lambda$ for polarizing filter n $E_{n\lambda}$=The polarization effect at $\lambda$ for polarizing filter n N=The number of polarizing filters FIG. 13 illustrates the numerator only of the above equation for each of the polarizing filters. The curves show the sum of the weighted effect of each filters.

Figure 14:
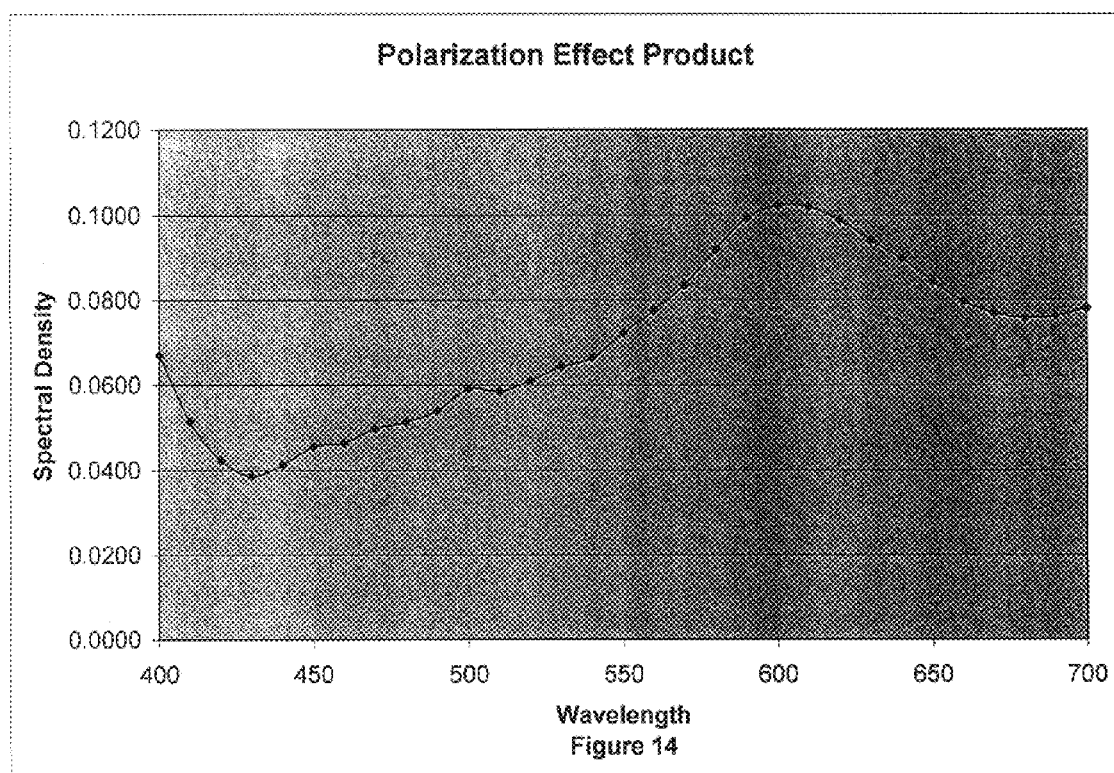
FIG. 14 is a graph illustrating the polarization effect product of each of the polarizing filters.

FIG. 14 illustrates the total result (i.e. the weight effect product) of the above equation for each of the polarizing filters (i.e. the total of all the weights averaged together). As expected, the weight effect product for each filter peaks at 1.0000 at its center wavelength. Each curve diminishes dramatically from the peak reflecting the relatively strong influence of the spectral displacement weight factor (FIG. 11).

The next step 116 is to calculate the "missing" (i.e. non-measured) twenty-two polarized points. Each polarized point for which there is not already an actual reading is calculated according to the following formula:

$$P_\lambda = NP_\lambda (1+E_\lambda)$$

Figure 15:
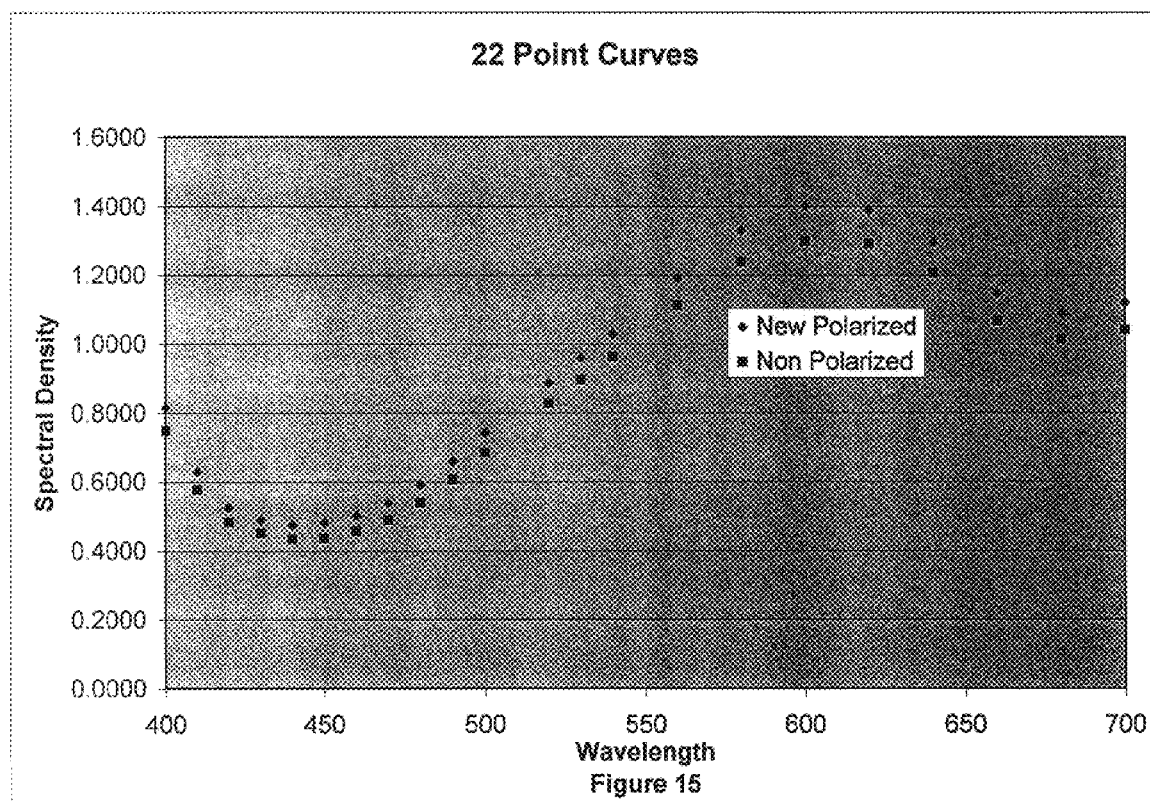
FIG. 15 is a graph illustrating the first calculation of polarized data based on the limited actual data acquired by the instrument.

Where: $P_\lambda$=Calculated polarized data at wavelength $\lambda$ $NP_\lambda$=Actual nonpolarized data at wavelength $\lambda$ $E_\lambda$=Weight effect product at wavelength $\lambda$ FIG. 15 illustrates the polarized and nonpolarized data following the calculation of step 116. The nonpolarized data in FIG. 15 is identical to the nonpolarized data in FIG. 9 because it is the actual nonpolarized data in both figs. However, FIG. 15 includes a polarized point at each wavelength for which there is a nonpolarized point. If an actual polarized reading was taken at the relevant wavelength, then the actual polarized reading is illustrated in FIG. 15. If there was not an actual polarized reading at the relevant wavelength, the polarized point is the calculation of step 116. Following step 116, there is (a) an actual nonpolarized point and (b) either an actual polarized point or a calculated polarized point.

In step 118, the twenty-two polarized points are Lagranged to produce thirty-one polarized points at 10 nm increments. Similarly in step 120, the twenty-two nonpolarized points are Lagranged to produce thirty-one nonpolarized points at 10 nm increments.

The results of steps 118 and 120 are illustrated in FIG. 16. Additionally, FIG. 16 includes a curve for the actual polarized data at all thirty-one points (see FIG. 7). As can be seen, the calculated polarized points have a high correspondence to the actual polarized points. Therefore, the technique of the present invention readily permits the accurate calculation of both the complete polarized spectral data and the complete nonpolarized spectral based on less then complete subsets of actual data for both the polarized data and the nonpolarized data.

The above description is that of a preferred embodiment of the invention. Various alterations and changes can be made without departing from the spirit and broader aspects of the invention as defined in the claims, which are to be interpreted in accordance with the principles of patent law, including the doctrine of equivalents.

The embodiments of the invention in which an exclusive property or privilege is claimed are defined as follows:

1. A method of measuring both the polarized spectral response and the nonpolarized spectral response of a sample comprising the steps of:

illuminating the sample with polarized light;

measuring the nonpolarized spectral response of the sample at a plurality of discrete nonpolarized wavelengths;

measuring the polarized spectral response of the sample at a plurality of discrete polarized wavelengths, the discrete polarized wavelengths being a nonidentical subset of the discrete nonpolarized wavelengths; and calculating the polarized spectral response at each discrete nonpolarized wavelength that is not also a discrete polarized wavelength, the calculating step being a function of the nonpolarized spectral response at the wavelength and the relationship of the polarized responses and the nonpolarized responses at other wavelengths.

2. The method of claim 1 wherein said calculating step is further a function of the spectral displacement of the other wavelengths from the wavelength.

3. The method of claim 1 wherein said measuring steps comprise:

positioning both nonpolarizing bandpass filters and polarizing bandpass filters in a circular configuration on a rotatable filter wheel; and rotating the filter wheel to align each of the filters with a light path extending between the sample and a detector.

4. A method of determining the nonpolarized spectral response and the polarized spectral response of a sample comprising the steps of:

measuring the actual nonpolarized response at a set of nonpolarized wavelengths;

measuring the actual polarized response at a set of polarized wavelengths, the sets of nonpolarized wavelengths and polarized wavelengths being different from one another; and calculating a calculated nonpolarized response and a calculated polarized response at the nonpolarized wavelengths and the polarized wavelengths for which there is only one of an actual nonpolarized response or an actual polarized response.

5. The method of claim 4 wherein said calculating step is a function of the one actual response at the wavelength and of the relationship of the nonpolarized and polarized responses at other wavelengths.

6. The method of claim 5 wherein said calculating step is further a function of the spectral displacement of the other wavelengths from the wavelength.

7. The method of claim 4 wherein said measuring steps comprise:
mounting both nonpolarized filters and polarized filters on a filter body; and
moving the filter body to automatically selectively align the filters with a light path extending between the sample and a detector.

8. A method of determining the nonpolarized spectral response and the polarized spectral response of a sample comprising the steps of:
illuminating the sample with polarized light;
measuring the nonpolarized spectral response of the sample at discrete nonpolarized wavelengths to generate actual nonpolarized data points;
measuring the polarized spectral response of the sample at discrete polarized wavelengths to generate actual polarized data points;
determining a plurality of ratios of the polarized data points to the nonpolarized data points, one ratio corresponding to each of the actual polarized data points;
calculating a calculated polarized data point at the nonpolarized wavelengths for which there is not a corresponding actual polarized data point, the calculating step being a function of the actual nonpolarized data point and two or more of the ratios; and
fitting a curve to the actual and calculated polarized data points.

9. The method of claim 8 wherein said fitting steps use a Lagrange function.

10. The method of claim 8 wherein said calculating step is further a function of the spectral displacements between the wavelengths corresponding to the two or more ratios and the wavelengths corresponding to the calculated polarized data point.

11. The method of claim 8 wherein said measuring steps comprise:
mounting both nonpolarizing and polarizing bandpass filters in a circular configuration on a filter wheel; and
rotating the filter wheel to automatically align each of the bandpass filters with a light path extending between the sample and a detector.

12. A method of measuring the nonpolarized spectral response and the polarized spectral response of a sample comprising the steps of:
illuminating the sample with polarized light;
measuring the nonpolarized light reflected from the sample; and
measuring the polarized light reflected from the sample, both of said measuring steps occurring automatically and substantially simultaneously.

13. The method of claim 12 wherein said measuring steps include:
mounting nonpolarizing filters and polarizing filters on a filter wheel; and
rotating the filter wheel to automatically align each of the bandpass filters with a light path extending between the sample and a detector.

14. A color measurement instrument comprising:
illuminator means for illuminating a sample with polarized light; and
measuring means for automatically and substantially simultaneously measuring both the nonpolarized response of the sample and the polarized response of the sample.

15. The spectral measurement instrument of claim 14 wherein said measuring means comprises:
a detector;
a filter body defining a plurality of windows;
a plurality of nonpolarized filters;
a plurality of polarized filters, said nonpolarized filters and said polarized filters mounted in said filter body windows; and
motive means for automatically moving said filter body to selectively align said windows, and therefore said nonpolarized filters and said polarized filters, with said detector.

16. The color measurement instrument of claim 15 wherein:
said filter body comprises a wheel having an axis of rotation;
said nonpolarized filters and said polarized filters are arranged in a circular configuration concentric with the axis of rotation; and
said motive means rotates said wheel about said axis of rotation.

17. A color measurement instrument comprising:
an illuminator for directing polarized light onto a sample;
detector means for detecting light reflected from the sample; and
filter means for filtering the reflected light received by said detector means, said filter means including a plurality of nonpolarized bandpass filters, said filter means further including a plurality of polarized bandpass filters, said filter means further including support means for supporting said nonpolarized and polarized filters, said filter means further including motive means for automatically and repetitively aligning said nonpolarized filters and said polarized filters with said detector means, whereby the reflected light passing through each of the nonpolarized filters and the polarized filters can be sampled by said detector means.

18. The spectral measurement instrument of claim 17 wherein:
said support means includes a filter wheel having an axis of rotation and defining a plurality of windows in a circular configuration concentric with the axis of rotation;
said bandpass filters are mounted in said windows in said filter wheel; and
said motive means includes means for rotating said filter wheel about its axis of rotation.

19. A color measurement instrument comprising:
a polarized light source adapted to illuminate a sample with polarized light;
a light detector on a light path from the sample to detect the intensity of light reflected by the sample;
a rotatable filter wheel having an axis and a plurality of windows arranged in a circle concentric with said axis;
a plurality of nonpolarizing bandpass filters in selected ones of said windows;
a plurality of polarizing bandpass filters in selected others of said windows; and
drive means for rotating said filter wheel to automatically selectively align said windows, and therefore said nonpolarizing filters and said polarizing filters, with said light path, whereby said light detector can detect the intensity of light passing through each of the nonpolarizing filters and the polarizing filters.

* * * * *